No. 858,072. PATENTED JUNE 25, 1907.
C. N. JOHNSON.
STONE CUTTING BIT.
APPLICATION FILED SEPT. 13, 1906.
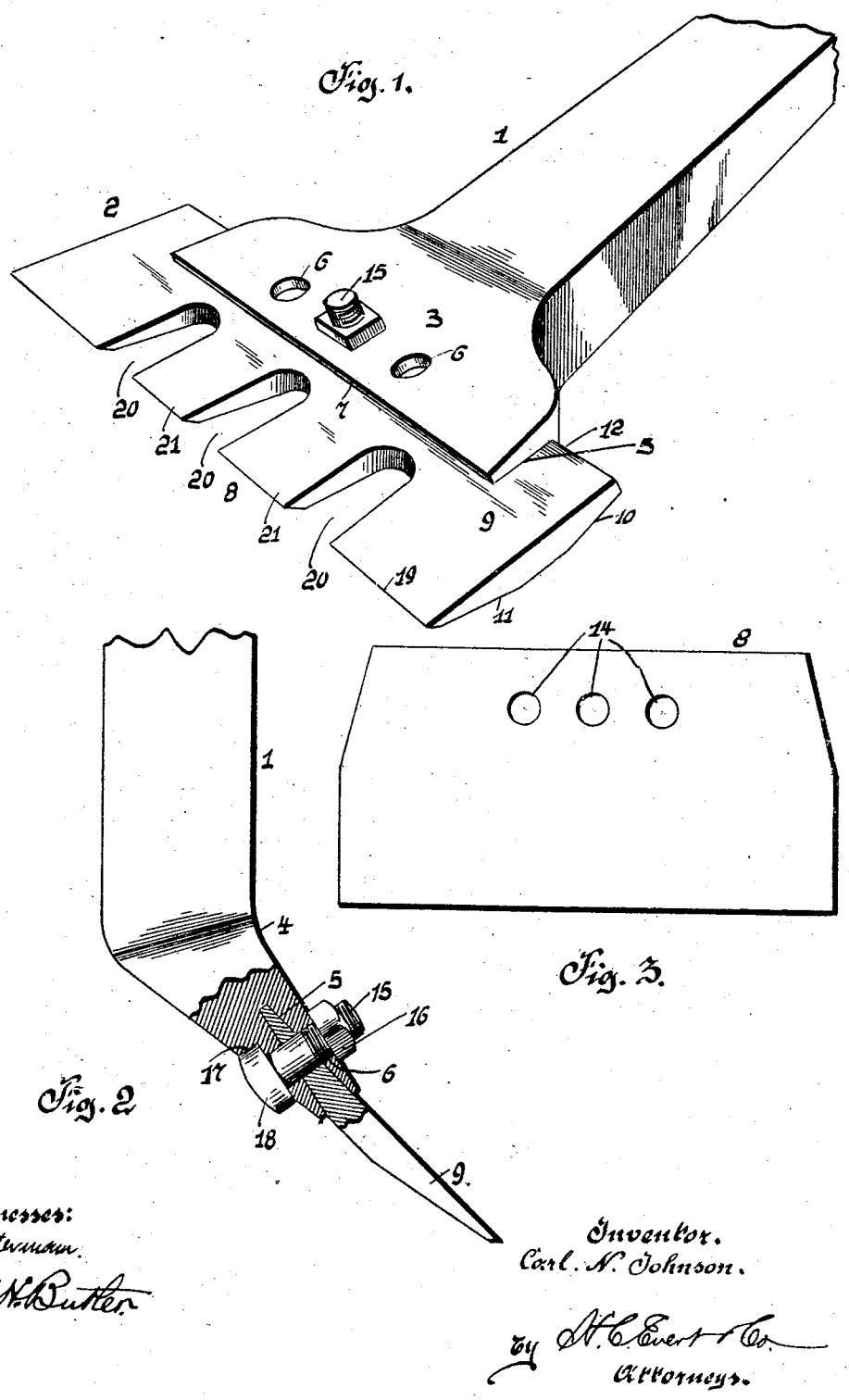

UNITED STATES PATENT OFFICE.

CARL N. JOHNSON, OF PITTSBURG, PENNSYLVANIA.

STONE-CUTTING BIT.

No. 858,072.          Specification of Letters Patent.          Patented June 25, 1907.

Application filed September 13, 1906. Serial No. 334,495.

To all whom it may concern:

Be it known that I, CARL N. JOHNSON, a citizen of the United States of America, residing at Pittsburg, in the county of Allegheny and State of Pennsylvania, have invented certain new and useful Improvements in Stone-Cutting Bits, of which the following is a specification, reference being had therein to the accompanying drawing.

This invention relates to certain new and useful improvements in stone cutting bits, and the invention has for its primary object to provide a novel form of two-part bit for stone cutting machines, the one part or cutting edge of said bit being removable, whereby it can be easily sharpened or renewed.

My invention is particularly adapted for that type of stone cutting machines employed for cutting moldings, curved or irregular surfaces upon large pieces of stone, particularly sand stone.

My invention aims to provide a two-part bit, the shank portion of said bit being constructed of an inexpensive material, while the head or the bit proper is constructed of a strong and durable steel, such as "Mercer" steel, thereby reducing the expense and the waste heretofore experienced in connection with bits at present used. The head of my improved bit is detachably mounted in the shank whereby after it has become worn or injured it can be easily and quickly removed, sharpened or ground or replaced by a new bit. The shank portion will thus serve for a great number of bit heads, and it is only rendered useless when injured by rough handling.

The detail construction of my improved bit will be hereinafter more fully described and then claimed, and referring to the drawing accompanying this application, like numerals of reference designate corresponding parts throughout the several views, in which:—

Figure 1 is a perspective view of my improved bit partly broken away, Fig. 2 is a side elevation of the same partly in section, and Fig. 3 is a plan of a bit head To put my invention into practice, I construct my improved bit of two parts, a shank portion 1 and a head 2. The shank portion 1 may be of any desired length and is preferably rectangular in cross section. The one end of the shank is flattened to form a tapering enlarged end 3, which is bent outwardly, as at 4, at an angle to the shank 1. By flattening the end 3, the end of the shank is formed approximately twice the width of the shank and in this end of the shank, I form a transverse tapering slot 5, which tapers inwardly toward the shank 1. The transverse slot 5 is formed from one edge of the end 1 to the opposite edge and said slot is intersected by a plurality of openings or apertures 6 formed in the end 3 of the shank at right angles to the slot 5. The openings are arranged in parallel alinement with the transverse edge 7 of the shank and are preferably formed centrally within the enlarged end 3.

The part 1 or the shank of the bit is made of an inexpensive material having sufficient tensile strength to withstand the strains and stresses exerted upon it when the part 2 or the bit proper is being used or is in operation.

The part 2 or the bit proper consists of a plate 8 having a flat surface or face 9 while its opposite face is provided with transverse beveled surfaces 10 and 11. The transverse edge 12 of the plate 8 is adapted to fit within the slot 5 of the shank, this edge of the plate being provided with a plurality of apertures or openings 14 adapted to register with the apertures or openings 6 of the shank in order that one or more bolts 15 may be passed through the apertures or openings to secure the plate 8 in engagement with the shank 1, this being accomplished by employing a nut 16 to retain the bolt 15 in engagement with said shank. The underneath face of the enlarged end 3 may be recessed adjacent to the openings or apertures 6, as at 17, to accommodate the head 18 of the bolt 15.

The projecting forward transverse edge of the plate 8 forms the cutting edge of the bit proper and this edge may be provided with a plurality of slots 20, 20 to form teeth 21, 21, this type of bit being used for producing a desired surface in the stone, but I do not care to confine myself to the contour of the cutting edge, as the same may be plain and uninterrupted, as illustrated in Fig. 3, or any other contour may be given to the edge to produce the desired molding or surface in the stone being operated upon by the bit.

It will be observed in the accompanying drawing, that I have simply illustrated one bolt and nut as holding the bit or part 2 within the shank or part 1, it being obvious that two or more bolts and nuts may be used to insure a perfect engagement of the part 2 with the part 1.

My improved bit is particularly adapted for stone cutting machines and the part 2 or bit proper just described is constructed of a strong and durable steel, that can be sharpened and ground from time to time to provide a perfect cutting edge. As this part of the bit is detachable from the shank 1, it is not necessary to construct the entire bit of a high grade steel, consequently I have reduced the expense of manufacturing bits for stone cutting machines.

Such changes in the construction of my improved bit, as are permissible by the appended claims, may be resorted to without departing from the spirit and scope of the invention.

What I claim and desire to secure by Letters Patent, is:—

1. A bit for stone cutting machines, consisting of a shank, said shank having an enlarged, flattened and angularly disposed end, the end of said shank having a transverse tapering slot formed therein, said end having a plurality of openings formed therein intersecting said slot, a plate adapted to fit in said slot, said plate having a transverse beveled cutting edge, means to secure said plate in said shank, substantially as described.

2. A bit, consisting of a shank, said shank having an enlarged flattened and angularly disposed end, the end of said shank having a transverse tapering slot formed therein, said end having a plurality of openings formed therein intersecting said slot, a plate adapted to fit in said slot, said plate having a transverse beveled cutting edge, means to secure said plate in said shank, substantially as described.

In testimony whereof I affix my signature in the presence of two witnesses.

CARL N. JOHNSON.

Witnesses:
   CONRAD FIX,
   WM. NICHOLSON.